United States Patent [19]

Kolseth

[11] Patent Number: 4,925,350

[45] Date of Patent: May 15, 1990

[54] SCREW ANCHOR

[76] Inventor: Donald H. Kolseth, 304 Buckingham Ter., Louisville, Ky. 40222

[21] Appl. No.: 436,318

[22] Filed: Nov. 14, 1989

[51] Int. Cl.⁵ .................................... F16B 39/02
[52] U.S. Cl. ................................ 411/82; 411/520
[58] Field of Search ............... 411/82, 257, 258, 520, 411/523, 524, 180, 166, 965, 85, 437, 527, 171, 172, 173, 174, 511, 516, 175, 81, 103, 132, 177, 529; 24/295, 305, 304; 52/716

[56] References Cited

U.S. PATENT DOCUMENTS

| | | | |
|---|---|---|---|
| 2,010,519 | 8/1935 | Jones | 411/520 |
| 2,286,383 | 6/1942 | Ryder | 411/520 |
| 2,319,678 | 5/1943 | Hall | 24/295 |
| 2,775,917 | 1/1957 | Ferguson | 411/82 X |
| 3,747,657 | 7/1973 | Ryder | 411/82 |
| 4,139,975 | 2/1979 | Baker | 52/506 |
| 4,587,705 | 5/1986 | Ruck et al. | 29/450 |
| 4,597,702 | 7/1986 | Brown | 411/529 |
| 4,647,263 | 3/1987 | Macfee, Jr. et al. | 411/82 |

Primary Examiner—Rodney M. Lindsey

[57] ABSTRACT

A screw anchoring device for aperture sealing attachment with an apertured panel to confine insulating material foamed in place between the panel and an attached spaced wall or other structure. The device includes a plate member having corners and a generally flat portion lying in a plane with a central aperture forming a helical screw receiving impression. The device also has a pair of upstanding tabs projecting from one face of the generally flat portion of the plate member at opposite sides of and adjacent to the screw impression. The plate member has a raised portion formed from the plate member at the corners and along each of two opposite edges of the flat portion of the plate member. These raised portions are convexly curved upwardly from the plane of the flat portion and from the face opposite from the face with the upstanding tabs and the corners of the plate member are semi-spherical shaped. There is a continuous pad of material capable of being penetrated by a screw and having an exposable adhesive surface substantially covering and carried by the plate member with the tabs projecting for entry into the paneled aperture and through the pad and having the adhesive surface of the pad extending across the panel aperture for mounting and sealing adherence to the adjacent panel surface to prevent egress of trapped insulating material through the paneled aperture. The screw impression is in position for threaded engagement with a screw passed through the panel aperture and the pad for attachment of a utility component to the opposite panel surface.

5 Claims, 3 Drawing Sheets

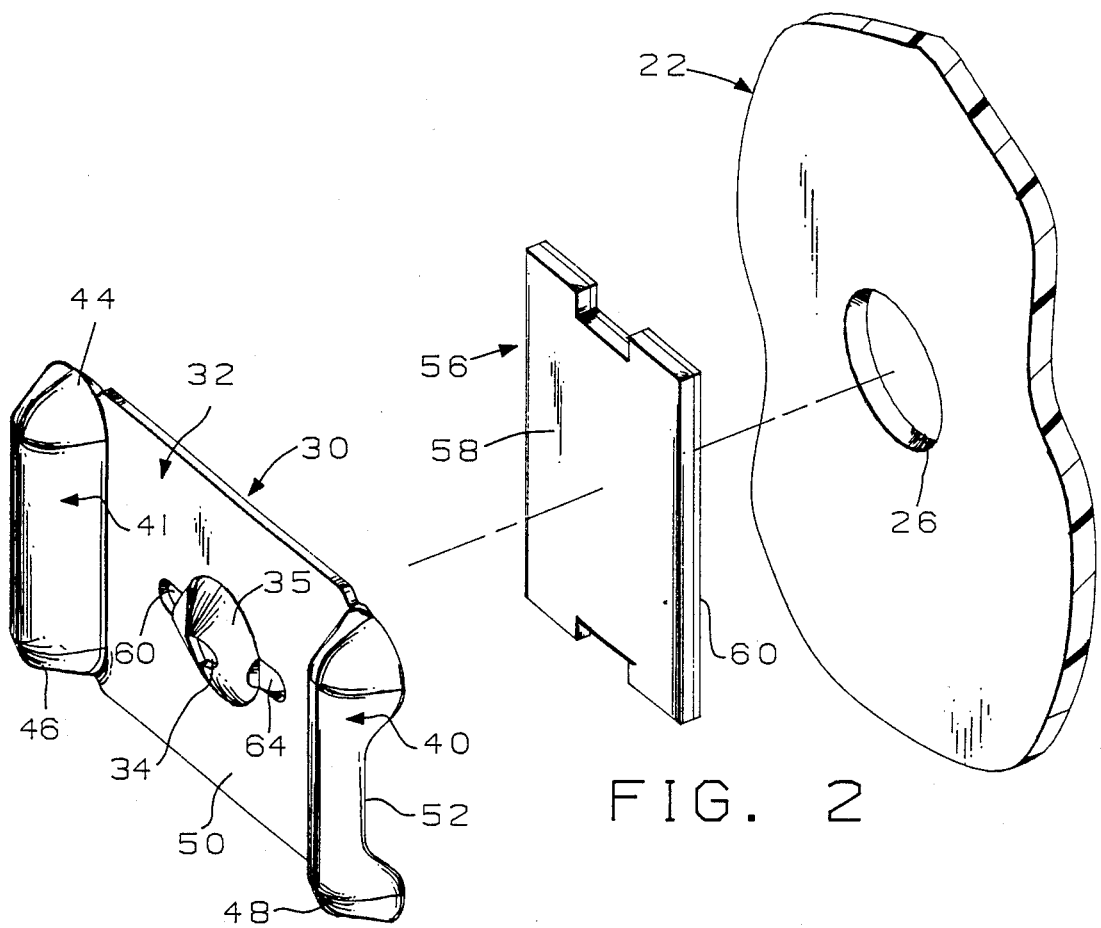
FIG. 2
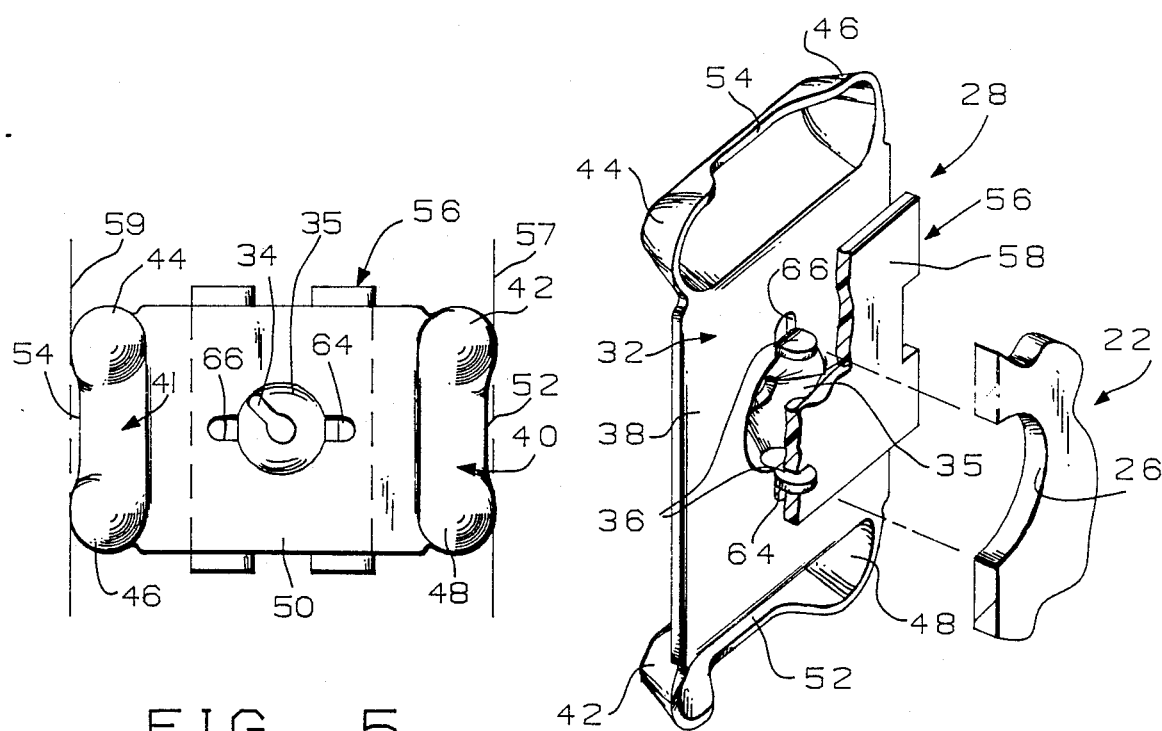
FIG. 5
FIG. 3

SCREW ANCHOR

BACKGROUND OF THE INVENTION

This invention is for a screw anchoring device to be assembled with an apertured wall for subsequent reception of a screw or the like through the aperture for mounting any one of a variety of utility components to the exposed side of the wall surface, such as, for example, a refrigerator in which the apertured wall constitutes the liner wall attached to an outer metal shell wall with the space between the walls filled with an insulating material which may be foamed in situ. One such prior art screw anchoring device is disclosed in U.S. Pat. No. 3,802,476 which has a plate member with a central aperture forming a helical screw receiving impression and a flat portion with a pair of upstanding tabs at opposite sides and adjacent the screw impression and a continuous pad of material having an exposable adhesive surface covering and carried by the plate member with the tabs projecting for entry into the paneled aperture and through the pad to locate the device and with the pad sealing the panel aperture to prevent the foamed material from escaping through the aperture. The prior art device plate member has two winged portions angled at 45° from the flat portion on opposite sides of the plate member and these wings are for manually gripping the tabs to put them in their proper position over the aperture and also to be imbedded in the foam material to prevent rotation. The prior art anchoring devices with wings are fastened to a refrigerator liner, which liner is then placed inside an outer metal shell made of pre-painted sheet metal. The refrigerator liner is usually made of plastic material and is slightly smaller than the outer metal shell of the refrigerator. After the screw anchor devices are secured to several locations on the outside surfaces of the plastic liner the liner is inserted into the outer metal shell prior to the thermal insulation foaming operation. These screw anchor devices are commonly used to attach brackets to the inside of the liner to support the shelves of the refrigerator.

One of the difficulties with the prior art winged screw anchor device is that upon inserting the liner with the screw anchor devices attached to the outside surface, the wings many times would contact the front face of the outer metal shell which is formed of pre-painted sheet metal. The edges of the wings of these devices are sharp and when they engage the pre-painted surface of the metal they scratch the paint. Such scratches are very costly to repair and in many cases repair is unsatisfactory and the outer metal shell has to be scrapped.

By this invention there is provided a screw anchor device which will prevent the screw anchor from scratching the pre-painted metal front face of the outer metal cabinet when the refrigerator liner is inserted into the outer metal case with the devices attached to the outside surfaces of the liner preparatory to the foaming operation.

SUMMARY OF THE INVENTION

A screw anchoring device for aperture sealing attachment with an apertured panel to confine insulating material foamed in place between the panel and an attached spaced wall or other structure. The device includes a plate member having corners and a generally flat portion lying in a plane with a central aperture forming a helical screw receiving impression. The device also has a pair of upstanding tabs projecting from one face of the generally flat portion of the plate member at opposite sides of and adjacent to the screw impression. The plate member has a raised portion formed from the plate member at the corners and along each of two opposite edges of the flat portion of the plate member. These raised portions are convexly curved upwardly from the plane of the flat portion and from the face opposite from the face with the upstanding tabs and having the corners of the plate member semi-spherical shaped.

The screw anchoring device also includes a continuous pad of a material capable of being penetrated by a screw and having an exposable adhesive surface substantially covering and carried by the plate member with the tabs projecting for entry into the panel aperture and through the pad and having the adhesive surface of the pad extending across the panel aperture for mounting and sealing adherence to the adjacent panel surface to prevent egress of trapped insulating material through the panel aperture. The screw impression is in position for threaded engagement with a screw passed through the panel aperture and the pad for attachment of a utility component to the opposite panel surface.

BRIEF DESCRIPTION OF THE DRAWINGS

FIG. 2 is an exploded perspective view of the screw anchoring device of the present invention and an apertured panel to which it is attached.

FIG. 3 is a perspective view of the underside of the screw anchoring device of the present invention and an apertured panel to which it is to be attached.

FIG. 5 is a top plan view of the screw anchoring device of the present invention.

DESCRIPTION OF THE PREFERRED EMBODIMENT

Figure 1:
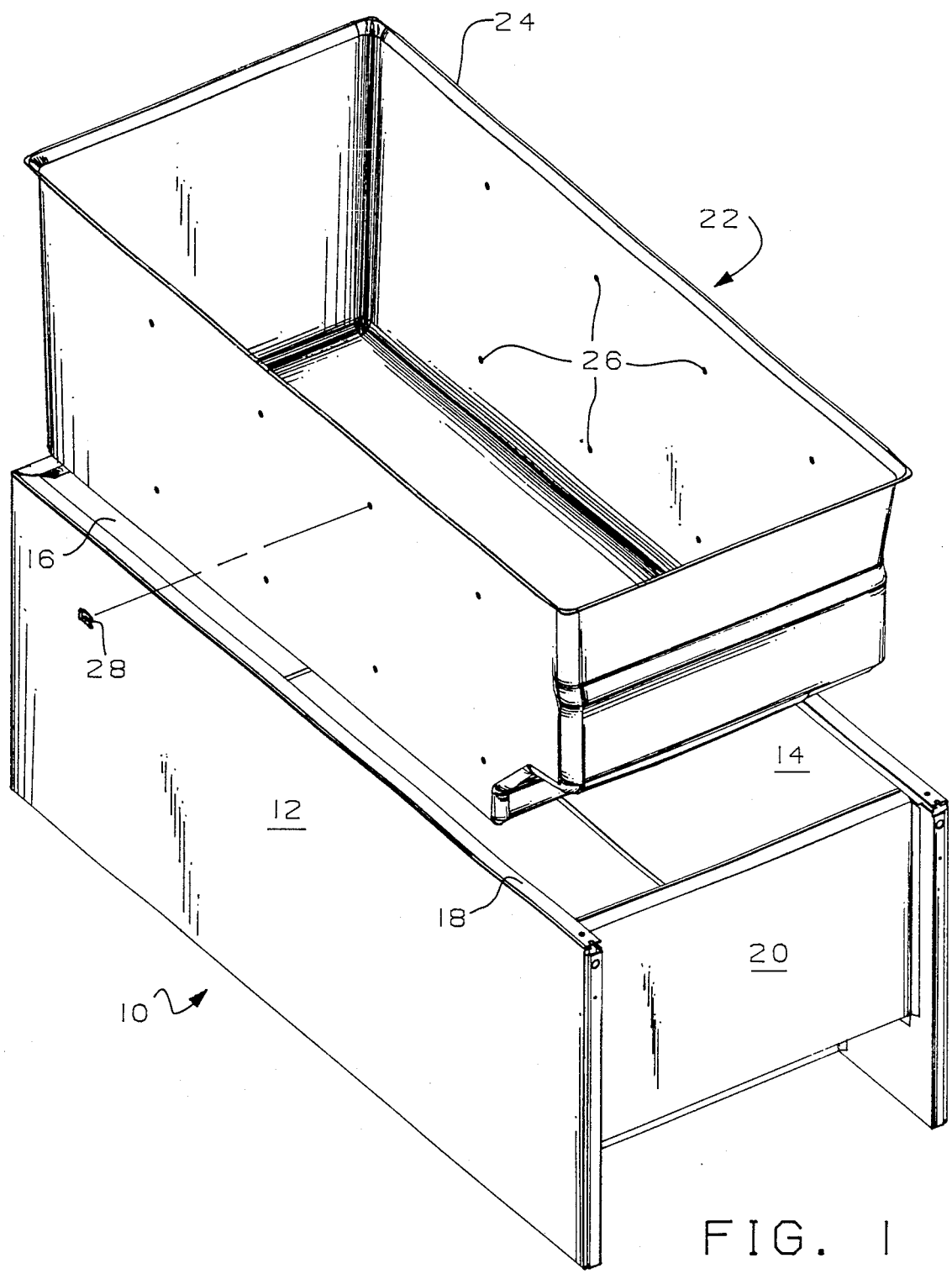
FIG. 1 is a perspective exploded view of a refrigerator outer metal shell and an inner liner utilizing the screw anchoring device of the present invention.

With reference to FIG. 1 there is shown a portion of a household refrigerator including an outer metal shell 10 which is made from a sheet of pre-painted metal and folded to provide side walls 12 and 14 and top wall 16 interconnecting the side walls. The side walls and top wall are folded to provide a front face 18 which extends along each of the side walls and the top wall. The bottom of the outer metal shell 10 has a machinery compartment wall 20 which is separately formed and retained in place by suitable fastening to the side walls 12 and 14.

The household refrigerator also includes an inner liner 22 which may be formed of sheet metal or in most cases plastic by a blow molding process. The inner liner 22 is slightly smaller than the opening of the outer metal shell between the side walls 12 and 14, top wall 16 and machinery compartment wall 20. The inner liner 22 has a peripheral outwardly extending flange 24 completely around the liner and this flange 24 is to be received in a space 23 (FIGS. 6-8) behind the front face 18 of the outer metal case when the liner is placed inside the outer case prior to the insulation foaming operation. Located on the side walls 12 and 14 of the liner are a plurality of apertures 26 and these apertures are spaced so that shelf supports may be mounted on the inside of the liner to receive the shelves of the refrigerator and retain them in their proper location. On the outside of the inner liner 22 are placed the screw anchoring device 28 of the present invention with one such device for each of the apertures in the walls of the inner liner 22. The purpose of the screw anchor devices are to lend structural support through the inner liner 22 for retaining shelf supports on the interior of the liner. After the inner liner 22 has the screw anchor devices 28 secured to all of the apertures 26 the liner is lowered into the outer metal shell 10 and when in proper position the thermal insulation foaming operation takes place. In most cases the thermal insulation is a resin foam insulation medium interposed between the outer metal shell 10 and the inner liner 22. The foam or polyurethane compositions in liquid/gas form are introduced into the space between the outer metal shell and inner liner, expand throughout the space and then are solidified by curing. In practice, this solid foam which inherently adheres to both the outer shell and inner liner adds rigidity to the cabinet structure. It is important that during the foaming operation that all of the apertures in the liner be sealed to prevent the egress of the insulating material through the holes into the inside of the liner.

With particular reference to FIGS. 2-5, the screw anchor device 28 will be described. The screw anchor device 28 comprises a plate member 30 with a generally flat portion 32 lying in a plane with a central aperture 34 forming a helical screw receiving impression 35. There is a pair of upstanding tabs 36 projecting from one face 38 and these tabs are struck from the flat portion by lancing and bending the tabs so that they are perpendicular to the plane of the flat portion 32. The upstanding tabs 36 are at opposite sides of and adjacent to the central aperture 34 and screw impression 35. The plate member 30 has raised portions 40 and 41 formed from the plate member along each of two opposite edges of the flat portion 32 of the plate member 30. These raised portions 40 and 41 are each convexly curved upwardly from the plane of the flat portion 32 and from the face 50 opposite from the face 38 with the upstanding tabs 36. The corners 42, 44, 46 and 48 of the plate member 30 are semi-spherical shaped.

Figure 8:
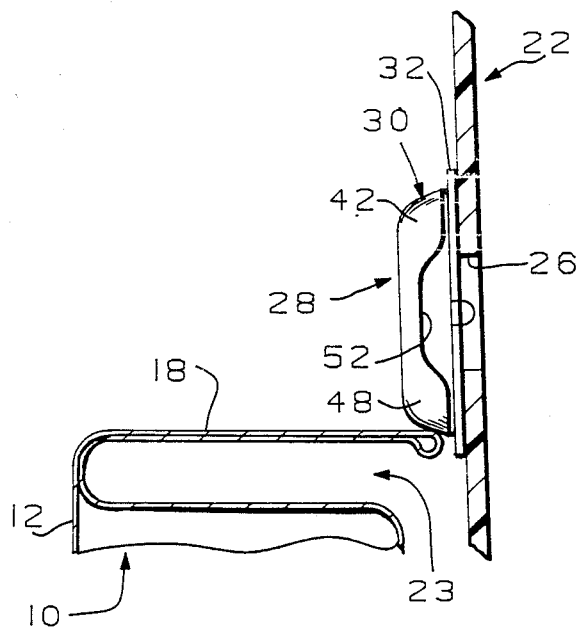
FIG. 8 is similar to FIG. 7 with the screw anchor oriented 90° from that shown in FIG. 7.

The screw anchor device further includes recess sections 52 and 54 along the outer edge of the respective raised portions 40 and 41 between the semi-spherical shaped corners 42 and 48 on one side and 44 and 46 on the opposite side of the plate member 30. With particular reference to FIG. 5, it can be seen that the recess sections 52 and 54 are located inwardly of the outer edges of the semi-spherical shaped corners. As seen in FIG. 5, the phantom lines 57 and 59 show that the recess sections 52 and 54 respectively are inwardly of the line drawn at the outer edge of the semi-spherical corners 42 and 48 respectively and 44 and 46 respectively. In addition to having the recess sections 52, 54 inwardly of the outer edges of the semi-spherical shaped corners, the recess sections are spaced above the plane of the flat portion 32 (FIG. 8). It will be noted also that the convexly curved raised portions 40 and 41 being formed from the plate member are hollow.

The screw anchoring device of the present invention further includes a continuous pad 56 of a material capable of being penetrated by a screw and having an exposable adhesive surface substantially covering and carried by the plate member 30 with the tabs 36 projecting through the pad 56. In the preferred embodiment the pad 56 is of the type presenting oppositely faced pressure sensitive adhesive surfaces such as adhesive surface 58 and the opposite surface which is also adhesive may be initially protected by removable paper cover 60. The pad 56 may be assembled to the tab side of the plate member 30 by suitable pressure means, as by a configured pressure plate or roller, to cause the tabs 36 to penetrate the pad and cover 60 with the under-adhesive surface of the pad adhering to the adjacent surface of the plate member in position with the pad covering the central aperture 34 and the screw impression 35, and with the tabs 36 projecting from the opposite adhesive surface of the pad from which the cover has been removed.

Figure 4:
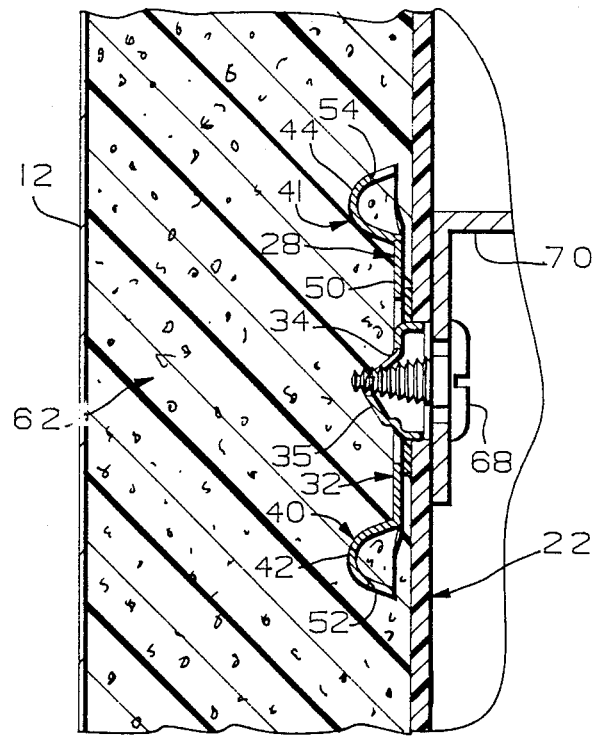
FIG. 4 shows the screw anchoring device of the present invention secure to an apertured panel in a refrigerator.

The assembled screw anchor device as described above can then be applied to the surface of a panel such as a portion of the inner liner 22 and the portion or panel will have a predetermined pattern of apertures formed therethrough depending upon the ultimate type of structure in which the panel is to be incorporated. In the inner liner 22, for example, the apertures are selectively located to provide for shelf supports. In FIGS. 2 and 3 there is shown one such panel aperture 26. Prior to application of the insulating material 62 (FIG. 4) the screw anchor device is applied to the surface of the liner by adhering the outer adhesive surface of the pad 56 to the panel with the tabs 36 extending into the panel aperture 26. These tabs 36 help to locate the aperture 26 so that the aperture 34 and screw impression 35 are oriented correctly with respect to the aperture 26 in the panel. If the panel aperture is square or rectangular, these tabs 36 serve to not only properly locate the screw anchor device relative to the aperture but also help to prevent relative rotation and may assume various dimensions and spacings depending upon the size of the aperture and thickness of the liner panel. It will be seen that the adhesive continuous pad 56 seals the openings 64 and 66 resulting from the struck out upstanding tabs 36 and the pad also seals off the screw impression aperture 34 as well as the aperture 26 in the panel of the inner liner 22. The recess sections 52 and 54 serve as convenient finger grip surfaces for facilitating initial placement of the screw anchor device on the panel surface of the inner liner 22 in proper position with the tabs 36 projecting into the liner aperture 26. After the screw anchor devices are secured to the liner, the outer cabinet metal shell 10 may be assembled with the liner by placing the liner inside the shell to provide a space therebetween and in which the insulating material 62 may be placed, as by pouring or foaming in situ. The panel aperture 26 is sealed against egress of the insulating material and the recess sections 52 and 54 of the screw anchor devices allow the foam to flow into the hollow upwardly convex raised portions 40 and 41 so as to further lock the screw anchor device in position and against rotation upon application of a screw 68 (FIG. 4) to the helical screw impression 35. Shown also in FIG. 4 is a shelf support member 70 which may now be rigidly secured to the relatively thin plastic inner liner 22 by means of the reinforcing structural arrangement of the screw anchor device and the adhering foam that surrounds and encapsulates the screw anchor device.

Figure 7:
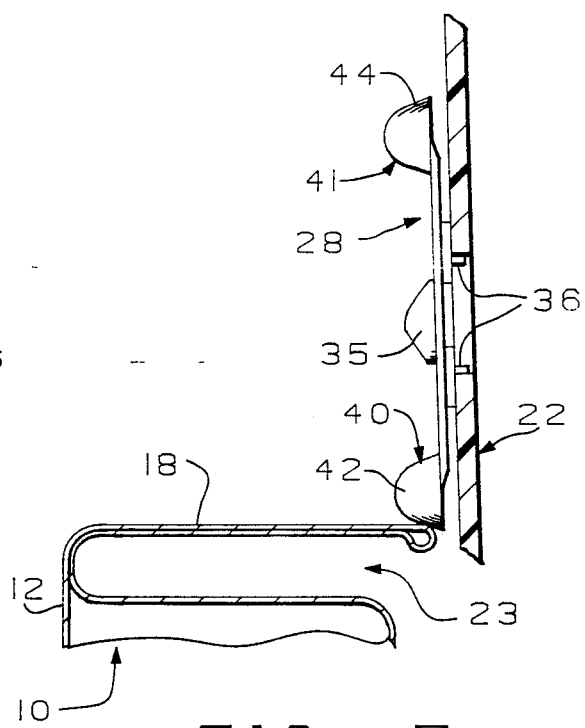
FIG. 7 is a side elevational view of the screw anchoring device of the present invention secured to a liner of a refrigerator being inserted into the outer metal shell of the refrigerator similar to FIG. 6.
Figure 6:
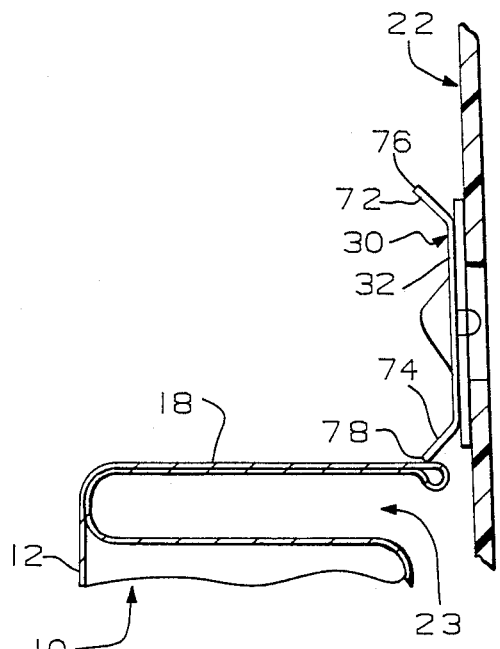
FIG. 6 is a side elevational view of a prior art screw anchor attached to a refrigerator liner being inserted into a refrigerator outer metal shell.

With reference to FIGS. 6–8, the functional purpose of the above-described screw anchor device configuration will be described. FIG. 6 shows the prior art screw anchor device described in U.S. Pat. No. 3,802,476 wherein the plate member 30 has a flat portion 32 and at opposite sides of the flat portion the plate member is bent upwardly at 45° to the flat portion to provide wings 72 and 74, both of which have sharp edges 76 and 78 respectively. When the screw anchor device of FIG. 6 has been attached to the inner liner 22, the inner liner as described above is inserted into the outer metal shell 10 which is made from pre-painted sheet metal and has the front face 18 exposed upwardly as shown in FIGS. 1 and 6. During the insertion of the liner 22 carrying the screw anchor device 28 as shown in FIG. 6 the edges 76 or 78 will often contact the front face 18 and scratch the paint surface. The scratched paint surface must either be repaired or if significantly damaged the entire outer metal shell 10 must be scrapped. This scratching can occur regardless of the orientation of the screw anchor device shown in FIG. 6. With reference to FIGS. 7 and 8, the screw anchor device 28 of the present invention is shown and under the same circumstances when the liner 22 carrying the screw anchor device 28 is inserted into the outer metal shell 10 should the screw anchor device 28 come in contact with the painted front face 18 of the metal shell 10 the rounded semi-spherical shaped corners will not mar or scratch the paint on the front face surface. As can be seen in FIGS. 7 and 8, it does not matter in which direction the screw anchor device is oriented. In FIG. 7 the raised portions 40 and 41 are oriented similarly to the wings 72 and 74 of the prior art screw anchor device shown in FIG. 6 and in FIG. 8 the screw anchor of the present invention is oriented 90° from that shown in FIG. 7.

While in accordance with the Patent Statutes, there has been described what at present is considered to be the preferred embodiment of the invention, it will be obvious to those skilled in the art that various changes and modifications may be made thereto without departing from the invention. It is therefore intended by the appended claims to cover all such changes and modifications as fall within the true spirit and scope of the invention.

What is claimed is:

1. A screw anchoring device for aperture sealing attachment with an apertured panel to confine insulating material foamed in place between the panel and an attached spaced wall or other structure comprising:

a plate member having corners and a generally flat portion lying in a plane with a central aperture forming a helical screw receiving impression, a pair of upstanding tabs projecting from one face of the generally flat portion of said plate member at opposite sides of and adjacent to said screw impression, said plate member having a raised portion formed from the plate member at the corners and along each of two opposite edges of said flat portion of said plate member, said raised portions each being convexly curved upwardly from the plane of the flat portion and from the face opposite from the face with the upstanding tabs and having the corners of the plate member semi-spherical shaped, and a continuous pad of a material capable of being penetrated by a screw and having an exposable adhesive surface substantially covering and carried by the plate member with the tabs projecting for entry into the panel aperture and through said pad and having the adhesive surface of the pad extending across the panel aperture for mounting and sealing adherence to the adjacent panel surface to prevent egress of trapped insulating material through the panel aperture, said screw impression being in position for threaded engagement with a screw passed through the panel aperture and the pad for attachment of a utility component to the opposite panel surface.

2. The screw anchoring device of claim 1 wherein there is a recess section along the outer edge of the convexly curved portion between the semi-spherical shaped corners and spaced above the plane of the flat portion.

3. The screw anchoring device of claim 2 wherein the recess section is inwardly of the outer edges of the semi-spherical shaped corners.

4. The screw anchoring device of claim 1 wherein the convexly curved portion is hollow.

5. The screw anchoring device of claim 1 wherein the adhesive pad is double faced for attachment to the plate member and to the panel surface.

* * * * *